United States Patent [19]

Imataki et al.

[11] Patent Number: 5,026,623
[45] Date of Patent: Jun. 25, 1991

[54] OPTICAL RECORDING MEDIUM

[75] Inventors: Hiroyuki Imataki, Kawasaki; Mizuho Hiraoka, Isehara; Yoshihiro Ogawa, Tokyo; Hitoshi Yoshino, Atsugi; Sachiko Ichikawa; Seijiro Kato, both of Sagamihara, all of Japan

[73] Assignee: Canon Kabushiki Kaisha, Tokyo, Japan

[21] Appl. No.: 532,127

[22] Filed: Jun. 4, 1990

Related U.S. Application Data

[60] Continuation of Ser. No. 249,233, Sep. 21, 1988, abandoned, which is a division of Ser. No. 39,020, Apr. 16, 1987, abandoned.

[30] Foreign Application Priority Data

Apr. 21, 1986 [JP] Japan ................................ 61-89954
Apr. 21, 1986 [JP] Japan ................................ 61-89955
Apr. 21, 1986 [JP] Japan ................................ 61-89956
Apr. 24, 1986 [JP] Japan ................................ 61-93227

[51] Int. Cl.$^5$ ........................... G03C 1/72; G11B 7/00
[52] U.S. Cl. ..................................... 430/270; 430/273; 430/275; 430/276; 430/945; 346/135.1
[58] Field of Search ............... 430/945, 495, 270, 273, 430/276, 275; 346/135.1, 137

[56] References Cited

U.S. PATENT DOCUMENTS

| 4,032,691 | 6/1977 | Kido et al. ........................ 428/304 |
| 4,245,229 | 1/1981 | Stephens ....................... 346/135.1 |
| 4,334,233 | 6/1982 | Murakami ..................... 346/135.1 |
| 4,636,804 | 1/1987 | Kuder .............................. 430/270 |
| 4,670,332 | 6/1987 | Werner et al. .................... 430/945 |

FOREIGN PATENT DOCUMENTS 225993 12/1984 Japan .................................. 430/276

Primary Examiner—Charles L. Bowers, Jr.
Assistant Examiner—Lee C. Wright
Attorney, Agent, or Firm—Fitzpatrick, Cella, Harper & Scinto

[57] ABSTRACT

An optical recording medium for performing writing and reading on a pit by use of a light of beam comprises an optical recording layer comprising a porous layer.

14 Claims, 2 Drawing Sheets

OPTICAL RECORDING MEDIUM

This application is a continuation of application Ser. No. 249,233, filed Sept. 21, 1988 now abandoned, which is a division of application Ser. No. 039,020, filed Apr. 16, 1987, also now abandoned.

BACKGROUND OF THE INVENTION

1. Field of the Invention

The present invention relates to an optical recording medium which can optically write and read information with the formation of pits by using a beam of light.

2. Related Background Art

Conventionally known optical recording media are those of the type wherein pits (holes) are produced, the type bubbles are formed and the type wherein phase transformation is caused, by irradiation with a beam of light, for example, a laser beam.

Of these, those of the type wherein pits (holes) are formed are constructed by providing on a substrate a thin film comprising a low melting metal such as Te, Bi, Sn, Sb and In, or a dye or pigment (organic coloring matter) of a cyanine type, a squarium type, a phthalocyanine type, a tetradehydrocholine type, a methine type, a naphthoquinone type, a benzene dithiol nickel complex, etc.; or a thin film comprising a composite system of any of these organic coloring matters and metals.

These thin films are irradiated with a beam of light, which is converted to heat energy according to their absorbance, and a recording pit is formed by the heat mode.

The recording pit thus formed is accompanied with bulging-out at the peripheral portion of a recording pit 15 as shown in FIG. 3 to produce a protuberance called a rim 16.

This rim may occur in the process of the melting and solidifying of an optical recording medium, which process is so greatly complicated that the shape and size of the rim can not always be uniform, and thus there have been brought about a disadvantage that may result in the error of a reading signal in reading.

SUMMARY OF THE INVENTION

An object of the present invention is to eliminate the defects conventionally seen as mentioned above, to provide an optical recording medium that can be free from any rims and can form recording pits always showing uniform shape and size.

Another object of the present invention is to provide an optical recording medium being small in the reading signal error percentage and having a high reliability.

According to the present invention, there is provided an optical recording medium for writing and reading information by use of a light beam, which comprises an optical recording layer having a porous layer.

DETAILED DESCRIPTION OF THE PREFERRED EMBODIMENTS

Specific constitution of the present invention will be described below with reference to the accompanying drawings.

Figure 1:
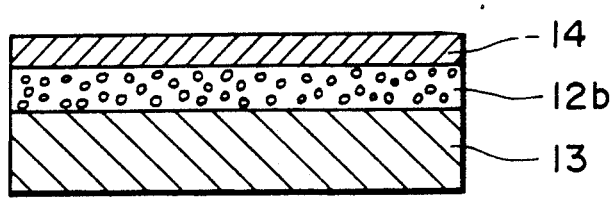
FIG. 1 is a cross-sectional view illustrating a typical example for the constitution of the optical recording medium according to the present invention.

FIG. 1 is a cross-sectional view illustrating a typical example for the constitution of the present invention. In FIG. 1, the optical recording medium of the present invention comprises a porous optical recording layer 12b provided on a substrate 13, and a protective layer 14 provided on said optical recording layer 12b.

In the present invention, the substrate 13 that can be used may include glass plates, ceramic plates, metallic plates such as aluminum plates and stainless steel plates, plastic plates, etc. The substrate may be of either transparent or opaque material, and also there is no particular limitation in the size so far as the function as a substrate for an optical recording medium can be satisfied. The optical recording layer may otherwise serve also as the substrate if the above conditions are satisfied.

In the present invention, one of the characteristic features thereof is that the optical recording layer 12b is a porous layer.

This optical recording layer is provided on the substrate 13 mentioned above. Here, the optical recording layer itself may be applied and set on the substrate, or the optical recording layer may be provided on the substrate by interposing an adhesive layer comprising a dry laminating agent or the like.

In the case the optical recording layer is applied beforehand on a thin film as in the case of a silver salt sensitive material, it can be set on the substrate together with the film by interposing the adhesive layer.

As the optical recording layer, there may be used the so-called heat mode recording material that can absorb light when irradiated with a beam of light, and can convert the absorbed light to heat to form recording pits by the heat, and moreover the optical recording layer is required to have a reflectivity for reading a signal.

The materials satisfying these performances are the conventional optical disc memory materials, but, in addition thereto, it is an essential requirement in the present invention that the optical recording layer is porous.

In this connection, the materials known as the conventional optical disc memory materials that can be preferably used may include low melting metals such as Te, Bi, Sn, Sb and In, or alloys of these; dyes or pigments of a cyanine type, a squarium type, a phthalocyanine type, a tetradehydrocholine type, a methine type, a naphthoquinone type, etc.; and organic metal complexes such as a benzene dithiol nickel complex.

To make such a medium porous, any of the following methods can be employed:

(1) A method in which casting is carried out while a swelling agent is acted on at the time of the film formation.

(2) A method in which a blowing agent such as azodicarbonamide and dinitropentamethylenetetramine is acted on at the time of the film formation.

(3) A method in which, at the time of the film formation, the film formation is carried out using two or more kinds of resins or a copolymer comprising two or more components as a dispersant, and thereafter a solvent is acted on to dissolve at least one component in the dispersant.

As the copolymer, there can be used a PVA/acrylonitrile type graft polymer, a PVA/acrylic type graft polymer, an ethyl acrylate/methyl methacrylate copolymer, etc.

For example, in a medium containing polyvinyl alcohol, vinyl acetate is emulsified and polymerized to form a film. Vinyl acetate is extracted with acetone to form a porous layer comprising polyvinyl alcohol.

(4) A method in which, at the time of the film formation, a disazo compound, a zinc chloride double salt with, e.g., p-diethylaminobenzene chloride or p-dimethylaminobenzenediazonium chloride, or an azide compound is used as a binder, on which light is irradiated.

(5) A method in which, in carrying out solvent casting, a porous film is produced by controlling the evaporation rate of the solvent.

Voids in the porous layer may be either open or closed, and the proportion of the voids per unit volume, i.e., voids (or void volume), may be 10% or more, preferably 10 to 90%, and particularly preferably 20 to 80%.

The methods of (1), (3) and (5) mentioned above are described in

"Membrane Science and Technology" Written by James Flinm, Plenum Press, New York, 1987;

"Annales de L'Institute Pasteur" Written by P. Grabar and J. A. De Loureiro; and "Synthetic Polymeric Membrane" Written by R. E. Kesting, McGraw Hill Book Company, New York, 1971, respectively.

Thickness of the optical recording layer may vary depending on the material and use of the porous layer, but it is desired to be usually 0.05 μm to 2 mm, preferably 0.1 μm to 0.5 mm.

In the present invention, the protective layer 14, which imparts resistance to mechanical, chemical and physical environment of the optical recording layer, covers the optical recording layer with a material transparent for the writing and reading light.

For example, a glass plate, a ceramic plate, a plastic plate made of polymethyl methacrylate, polycarbonate, polyvinyl chloride, polyethylene terephthalate, polystyrene, CR-39, polymethylpentene, etc. may be provided on the optical recording layer by optionally interposing an adhesive layer. It is preferred for the protective layer to have a thickness of usually 0.01 to 5 mm.

For another example, the plastic material as mentioned above may be applied directly on the optical recording layer, and may be allowed to cure to make the protective layer. In this instance, it is also possible to use a radiation-curable resin.

The protective layer is provided on the optical recording layer, but may not necessarily be in close contact therewith, and may be provided by interposing air or inert gas.

On the outside surface of the protective layer, there may be optionally applied abrasion resistance treatment, hardening treatment, stain- and contamination-proof treatment and antistatic treatment for the purpose of preventing scratches or attachment of dusts during being handled; or moisture-proof treatment, ultraviolet-proof treatment and oxygen permeation-proof treatment ($O_2$ gas barrier treatment) aiming at the improvement in durability.

Figure 2:
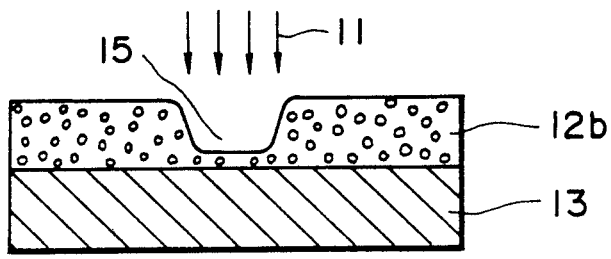
FIG. 2 is a cross-sectional view illustrating a state of the writing of information.
Figure 3:
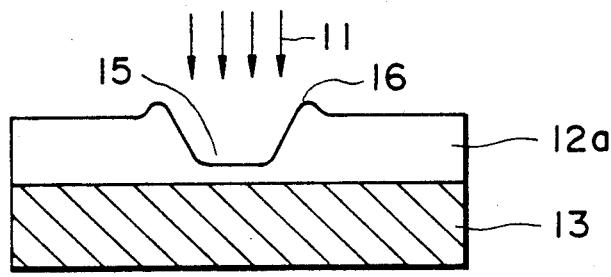
FIG. 3 is an explanatory illustration of how a recording pit is formed in a conventional optical recording medium.

Irradiating a laser beam 11 on the optical recording medium of the present invention from the side of the optical recording layer 12b as shown in FIG. 2 to carry out the writing of information, a recording pit 15 is formed on the light-irradiated portion of the optical recording layer 12b. At the time the writing of information is carried out by this light irradiation, the voids in the porous layer decrease at the light-irradiated portion along with the softening and melting of the optical recording layer, so that the shape of the recording pit can be corrected to produce a pit being free from any rim and having uniform size, thereby giving excellent reading signals.

Moreover, the optical recording medium of the present invention, whose optical recording layer has high sensitivity, has high absorption for converting light energy to heat energy, has a reflectance of, e.g., 15% or more which is suitable for detecting a signal having good contrast, and also has excellent durability (being durable to the storage for at least 10 years or more).

Figure 4:
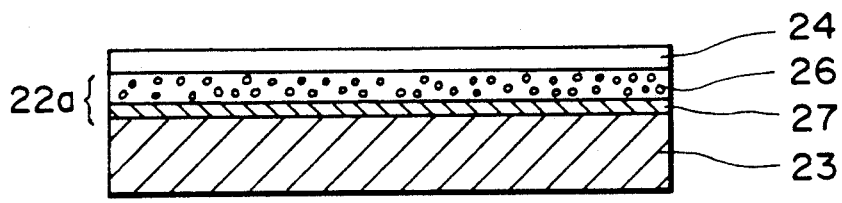
FIG. 4 is a cross-sectional view illustrating another typical example for the constitution of the optical recording medium according to the present invention.
Figure 5:
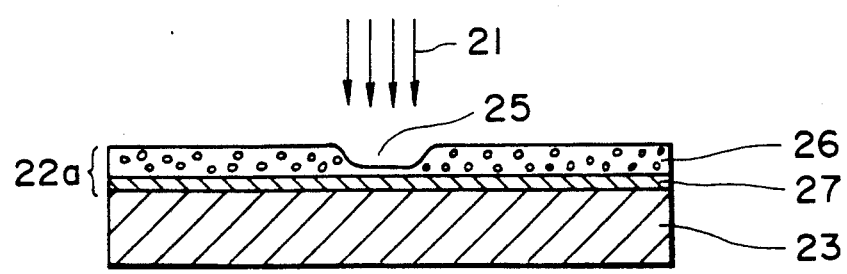
FIG. 5 is a cross-sectional view illustrating a state of the writing of information.

FIG. 4 and FIG. 5 illustrate another embodiment of the optical recording medium of the present invention, wherein the optical recording layer comprises a porous light-reflective layer and a light-adsorptive layer.

In FIG. 4, the optical recording medium of the present invention comprises an optical recording layer 22a formed by laminating a porous light-reflective layer 26 and a light-absorptive layer 27; said optical recording layer 22a is provided on a substrate 23 in the manner that the light-absorptive layer 27 is downward positioned, and a protective layer 24 is provided as an outermost layer to protect the light-reflective layer 26.

The light-reflective layer constitutes an important factor for defining the S/N ratio of the recorded information, and is required to have a large ratio of the reflection intensity before recording to the reflection intensity after recording. In addition, the signal reflected from this light-reflective layer serves as the signal for performing AT (auto-tracking) and AF (auto-focusing) which are important for the writing and reading in an optical recording medium.

When considering these points, the reflectance of the light-reflective layer is more preferable as it is higher, but, considering the recording in the medium, an appropriate transmittance is also required, and thus a reasonable balance is required between the both. Accordingly, the desirable reflectance of the light-reflective layer may be 10 to 85%, preferably 15 to 60%.

The light reflective layer may be formed by dispersing particles of a metal such as gold, silver and copper in a binder, followed by coating.

The binder for dissolving or dispersing these light-absorptive materials may include organic high molecular substances of a vinyl type such as polyvinyl chloride, polyvinyl alcohol and polyvinyl acetate, an olefin type such as polyethylene and polypropylene, an acrylic type such as polymethyl methacrylate and polymethyl acrylate, a polyester type, a polyamide type, a polystyrene type, a cellulose type, a polycarbonate type, an ionomer type, etc.; organic carboxylic acids such as stearic acid, palmitic acid, phthalic acid and succinic acid; solid paraffin; etc.

As these materials, preferably usable are those which can cause thermal deformation such as melting and heat-softening at a lower temperature of 400° C. or lower, preferably at a lower temperature of 200° C. or lower.

To make such a light-reflective layer porous, the same method of forming the porous optical recording layer shown in FIG. 1 may be followed.

Voids in the porous layer may be either open or closed, and the proportion of the voids per unit volume, i.e., voids (or void volume), may be 10% or more, preferably 10 to 90%, and particularly preferably 20 to 80%.

Thickness of the light-reflective layer may be determined depending on the reflectance, etc. to be defined in relation to the light-absorptive layer constituting the optical recording layer, and may be in the range of several ten Å to several mm, preferably 20 Å to 1.0 mm.

In the present invention, the light-reflective layer absorbs energy of irradiated light and converts it to heat energy, and transforms the laminated light-reflective layer by the heat to form the recording pits.

The light-absorptive layer is composed of organic coloring materials having absorption characteristics at a wavelength of a recording beam at the time of the optical recording, or formed by dispersing these light-absorptive materials in a binder.

As the light absorptive layer, the material that can be preferably used may include low melting metals such as Te, Bi, Sn, Sb and In, or alloys of these; particles of metals such as Au, Ag and Cu; organic coloring materials of a cyanine type, a squarium type, a phthalocyanine type, a tetradehydrocholine type, a methine type, a naphthoquinone type, etc.; organic metal complexes such as a benzene dithiol nickel complex; and black materials such as carbon black and Nigrosine.

The light-absorptive layer may have a film thickness of several ten Å to several mm, preferably 700 Å to 1.8 mm.

In the present invention, the optical recording layer is provided on the substrate 23. Here, the light-absorptive layer and the porous light-reflective layer may be applied in sequence on the substrate to set the optical recording layer, or the optical recording layer may be provided on the substrate by interposing an adhesive layer comprising a dry laminating agent or the like.

In the case where the optical recording layer is applied beforehand on a thin film such as in, for example, a silver salt sensitive material, the optical recording layer can be set on the substrate together with the film by interposing the adhesive agent.

Irradiating a laser beam 21 on the optical recording medium of the present invention from the side of the optical recording layer 22a as shown in FIG. 5 to carry out the writing of information, a recording pit 25 is formed on the light-irradiated portion of the optical recording layer 22a. At the time the writing of information is carried out by this light irradiation, the voids in the porous layer decrease at the light-irradiated portion along with the softening and melting of the porous light-reflective layer 26, so that the shape of the recording pit can be corrected to produce a pit being free from any rim and having uniform size, thereby giving excellent reading signals.

Figure 6:
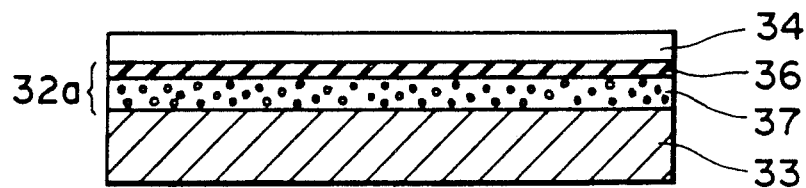
FIG. 6 is a cross-sectional view illustrating still another typical example for the constitution of the optical recording medium according to the present invention.
Figure 7:
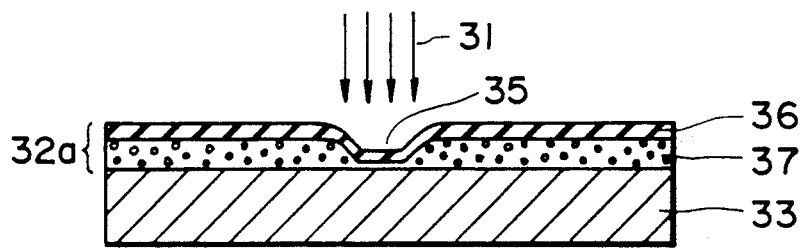
FIG. 7 is a cross-sectional view illustrating a state of the writing of information.

FIG. 6 and FIG. 7 illustrate still another embodiment of the recording medium of the present invention, wherein the optical recording layer comprises a light-reflective layer and a porous light-absorptive layer In FIG. 6, the optical recording medium comprises an optical recording layer 32a formed by laminating a light-reflective layer 36 and a porous light-absorptive layer 37; said optical recording layer 32a is provided on a substrate 33 in the manner that the light-absorptive layer 37 is downward positioned, and a protective layer 34 is provided as an outermost layer to protect the light-reflective layer 36.

The reflectance of the light-reflective layer is more preferable as it is higher, but, considering the recording in the medium, an appropriate transmittance is also required, and thus a reasonable balance is required between the both. Accordingly, the desirable reflectance of the light-reflective layer may be 10 to 85%, preferably 15 to 60%.

The reflective layer may be formed by vapor deposition or electroless plating using metals such as gold, silver and copper, or by applying particles of these metals by dispersing them in a vehicle.

The film thickness of the light-reflective layer is determined depending on the reflectance determined in relation to the light-absorptive layer constituting the optical recording layer, and on the processing method therefor, namely, on what is selected from the vapor deposition, the electroless plating and the coating of a dispersion medium, and it may range between several ten Å and several mm, preferably 20 Å and 1.0 mm.

In the present invention, the light-reflective layer has both the function to absorb energy of the irradiated light and convert it to heat energy, and the function to transform itself by the heat to form a laminated reflective layer and recording pits.

The light-absorptive layer is composed of organic coloring materials having absorption characteristics at a wavelength of a recording beam at the time of the optical recording, or formed by dispersing these light-absorptive materials in a vehicle or binder, and these are further controlled to be made porous.

For the light-absorptive layer, the material that can be preferably used may include low melting metals such as Te, Bi, Sn, Sb and In, or alloys of these; particles of metals such as Au, Ag and Cu; organic coloring materials of a cyanine type, a squarium type, a phthalocyanine type, a tetradehydrocholine type, a methine type, a naphthoquinone type, etc.; organic metal complexes such as a benzene dithiol nickel complex; and black coloring materials such as carbon black and Nigrosine.

The vehicle or binder for dissolving or dispersing these light-absorptive materials may include organic high molecular substances of a vinyl type such as polyvinyl chloride, polyvinyl alcohol and polyvinyl acetate, an olefin type such as polyethylene and polypropylene, an acrylic type such as polymethyl methacrylate and polymethyl acrylate, a polyester type, a polyamide type, a polystyrene type, a cellulose type, a polycarbonate type, an ionomer type, etc.; organic carboxylic acids such as stearic acid, palmitic acid, phthalic acid and succinic acid; solid paraffin; etc.

As these materials, preferably usable are those which can cause thermal deformation such as melting and heat-softening at a lower temperature of 400° C. or lower, preferably at a lower temperature of 200° C. or lower.

To make such a light-absorptive layer porous, the same method of forming the porous optical recording layer shown in FIG. 1 may be followed.

Voids in the porous layer may be either open or closed, and the proportion of the voids per unit volume, i.e., voids (or void volume), may be 10% or more, preferably 10 to 90%, and particularly preferably 20 to 80%.

The light-absorptive layer may have a film thickness of several ten Å to several mm, preferably 700 Å to 1.8 mm.

In the present invention, the optical recording layer is provided on the substrate 33. Here, the porous light-absorptive layer and the light-reflective layer may be applied in sequence on the substrate to set the optical recording layer, or the optical recording layer may be provided on the substrate by interposing an adhesive layer comprising a dry laminating agent or the like.

Irradiating a laser beam 31 on the optical recording medium of the present invention from the side of the optical recording layer 32a as shown in FIG. 7 to carry out the writing of information, a recording pit 35 is formed on the light-irradiated portion of the optical recording layer 32a. At the time the writing of information is carried out by this light irradiation, the voids in the porous layer decrease at the light-irradiated portion along with the softening and melting of the porous light-absorptive layer, so that the shape of the recording pit can be corrected to produce a pit being free from any rim and having uniform size, thereby giving excellent reading signals.

Figure 8:
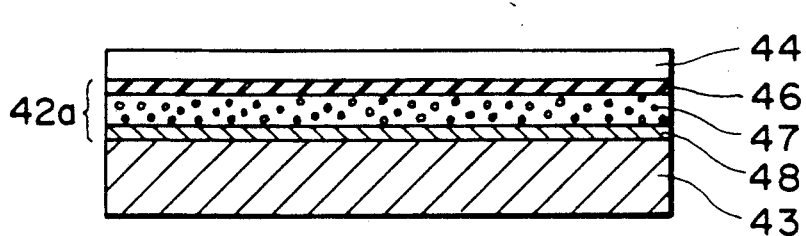
FIG. 8 is a cross-sectional view illustrating still another typical example for the constitution of the optical recording medium according to the present invention.
Figure 9:
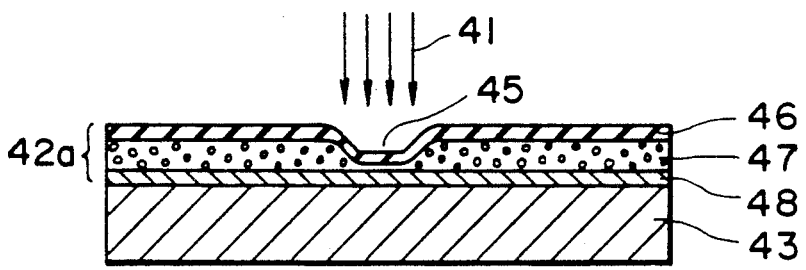
FIG. 9 is a cross-sectional view illustrating a state of the writing of information.

FIG. 8 and FIG. 9 illustrate still another embodiment of the recording medium of the present invention, wherein the optical recording layer comprises a light-reflective layer, a porous recording auxiliary layer and a light-absorptive layer.

In FIG. 8, the optical recording medium of the present invention comprises an optical recording layer 42a formed by laminating a light-reflective layer 46 and a light-absorptive layer 48 with the interposition of a porous recording auxiliary layer 47 therebetween; said optical recording layer 42a is provided on a substrate 43 in the manner that the light-absorptive layer 48 is downward positioned, and a protective layer 44 is provided as an outermost layer to protect the light-reflective layer 46.

Alternatively, as still another embodiment of the optical recording medium of the present invention, the above layers may be laminated in the order of a light-reflective layer, a light-absorptive layer, a porous recording auxiliary layer, and a substrate.

The light-reflective layer has the same constitution as that of the light-reflective layer shown in FIG. 6.

In this optical recording medium, the light-absorptive layer absorbs irradiated light energy, and convert it to heat energy to transform the recording auxiliary layer by the heat, thereby forming a laminated reflective layer and recording pits.

The light-absorptive layer is composed of organic coloring materials having absorption characteristics at a wavelength of a recording beam at the time of the optical recording, or formed by dispersing these materials in a binder.

For the light-absorptive layer, the material that can be preferably used may include low melting metals such as Te, Bi, Sn, Sb and In, or alloys of these; particles of metals such as Au, Ag and Cu; organic coloring materials of a cyanine type, a squarium type, a phthalocyanine type, a tetradehydrocholine type, a methine type, a naphthoquinone type, etc.; organic coloring materials such as a benzene dithiol nickel complex; and black materials such as carbon black and Nigrosine.

The light-absorptive layer may have a film thickness of several ten Å to several mm, preferably 200 Å to 0.5 mm.

In the present invention, the recording auxiliary layer, the materials that can be preferably used may include organic high molecular substances of a vinyl type such as polyvinyl chloride, polyvinyl alcohol and polyvinyl acetate, an olefin type such as polyethylene and polypropylene, an acryl type such as polymethyl methacrylate and polymethyl acrylate, a polyester type, a polyamide type, a polystyrene type, a cellulose type, a polycarbonate type, an ionomer type, etc.; organic carboxylic acids such as stearic acid, palmitic acid, phthalic acid and succinic acid; solid paraffin; etc.

As these materials, preferably usable are those which can cause thermal deformation such as melting and heat-softening at a lower temperature of 400° C. or lower, preferably at a lower temperature of 200° C. or lower.

To make such a light-absorptive layer porous, the same method of forming the porous optical recording layer shown in FIG. 1 may be followed.

Voids in the porous layer may be either open or closed, and the proportion of the voids per unit volume, i.e., void (or void volume), may be 10% or more, preferably 10 to 90%, and particularly preferably 20 to 80%.

The light-absorptive layer may have a thickness of several ten Å to several mm, preferably 700 Å to 1.8 mm.

The film formation of the recording auxiliary layer can be carried out according to any of conventionally known coating methods such as bar coating and roll coating.

Irradiating a laser beam 41 on the optical recording medium from the side of the optical recording layer 42a as shown in FIG. 9 to carry out the writing of information, a recording pit 45 is formed on the light-irradiated portion of the optical recording layer 42a. At the time the writing of information is carried out by this light irradiation, the voids in the porous layer decrease at the light-irradiated portion along with the softening and melting of the porous recording auxiliary layer 47, so that the shape of the recording pit can be corrected to produce a pit being free from any rim and having uniform size, thereby giving excellent reading signals.

As described above, in the optical recording medium of the present invention, the optical recording layer has a porous layer, whereby it is made possible to make always uniform the shape of recording pits and also to decrease the reading signal error percentage at the time of reading, advantageously.

The present invention will be described in greater detail by the following Examples.

EXAMPLE 1

In 50 parts by weight of an ethanol solution containing 20% by weight of polyvinyl butyral, 30 parts by weight of a cyanine type dye, NK 1414 (available from Nikko Kanko Shikiso K.K.), and 20 parts by weight of azodicarbonamide as a blowing agent were compounded to effect homogeneous mixing, and the mixture was applied on a transparent polyethylene terephthalate substrate Lumirror T, trademark; available from Toray Industries Inc.) of 250 μm thick by means of a bar coater to carry out film formation, thereby obtaining an optical recording medium comprising a porous optical recording layer having a film thickness of 2 μm and voids of 70%.

On the resulting optical recording layer, writing was performed using a semiconductor laser of 830 nm with beam diameter of 3 μm and with a power of 3 mW on the recording face. As a result, there was obtained 0.5 or more of contrast in the reading signal at the reading power of 0.1 mW. The recording pits formed here were observed with use of a scanning electron microscope to reveal that no rim was formed and there were obtained recording pits having a pit diameter of 3.0±0.2 μm and being very uniform in their size.

COMPARATIVE EXAMPLE 1

Example 1 was repeated except that no blowing agent, azodicarbonamide, was used, to obtain an optical recording medium by carrying out film formation of an optical recording layer having a film thickness of 2 μm.

On the resulting optical recording layer, writing was performed in the same manner as in Example 1. As a result, there was obtained 0.38 or more of contrast, and, as a result of the observation with use of a scanning electron microscope, there was seen occurence of rims on the peripheries of the recording pits and also seen the unevenness pit diameter of 2.5 to 4.6 μm.

EXAMPLE 2

To a methanol solution containing 30% by weight of polyvinyl alcohol (polymerization degree: 1,900 to 2,100; available from Kishida Chemical Co., Ltd.), Diaresin Blue G (trademark; available from Mitsubishi Chemical Industries Limited) was added so as to be in amount of 30% by weight to the polyvinyl alcohol.

Subsequently, colloidal gold (particle size: 10 to 20 nm; available from Polyscience Co.) was added to the above solution so as to be in amount of 25% by weight, and the whole mixture was thoroughly stirred to make a homogeneous suspension.

The resulting solution was applied on a polycarbonate substrate of 1.0 mm thick to carry out film formation by spin coating under the condition of the revolution number of 2000 rpm, followed by dipping in m-xylene and drying to obtain a porous optical recording layer having a film thickness of 7 μm.

On the resulting optical recording layer, writing and reading were performed under the same conditions as in Example 1, and, as a result, there was obtained 0.4 or more of contrast in the reading signal.

The recording pits formed were also observed with use of a scanning electron microscope to reveal that no rim was formed and there were obtained recording pits having a pit diameter of 3.0±0.3 μm.

EXAMPLE 3

In 50 parts by weight of an ethanol solution containing 20% by weight of polyvinyl butyral, 30 parts by weight of carbon black (available from Nihon Columbia Carbon Co.) were compounded to effect homogeneous mixing, and the mixture obtained was applied on a polycarbonate substrate of 2.0 thick mm to carry out film formation by bar coating to obtain a light-absorptive layer having a film thickness of 2.0 μm.

Subsequently, 50 parts by weight of Cu particles having a particle diameter of 0.01 to 0.05 μm, 50 parts by weight of polyvinyl butyral as a binder and 20 parts by weight of azodicarbonamide (available from Kishida Chemical Co., Ltd.) as a blowing agent were dispersed in an ethanol solution to effect homogeneous mixing, and the mixture was applied on the above light-absorptive layer by means of a bar coater to carry out film formation, thereby obtaining an optical recording medium having an optical recording layer provided with a porous light-reflective layer having a film thickness of 2.0 μm and voids of 63%.

On the resulting optical recording layer, writing was performed using a semiconductor laser of 830 nm with beam diameter of 3 μm and with a power of 2.5 mW on the recording face. As a result, there was obtained 0.80 or more of contrast in the reading signal at the reading power of 0.2 mW.

The recording pits formed here were observed with use of a scanning electron microscope to reveal that no rim was formed and there were obtained recording pits having a pit diameter of 3.0±0.3 μm and being very uniform in their size.

EXAMPLE 4

In 70 parts by weight of a methanol solution containing 25% by weight of polyvinyl alcohol (polymerization degree: 2,000; available from Kishida Chemical Co., Ltd.), 40 parts by weight of Vali Fast Black #3804 (trademark; available from Orient Chemical Industries Ltd.) was compounded to effect homogeneous mixing, and the mixture obtained was applied on a polyethylene terephthalate film of 0.01 mm thick (trade name: Lumirror; available from Toray Industries, Inc.) by bar coating to obtain a light-absorptive layer, and, subsequently, 18 parts by weight of silver particles having a particle diameter of 50 to 500 Å, 30 parts by weight of polyvinyl alcohol as a binder and 20 parts by weight of azodicarbonamide as a blowing agent were compounded in 100 parts by weight of a methanol solution to effect thorough stirring, followed by applying on the above light-absorptive layer to obtain a porous light-reflective layer having a dried film thickness of 2.0 μm.

On the resulting optical recording layer, writing and reading were carried out under the same conditions as in Example 3. As a result, there was obtained 0.77 or more of high contrast, and, as a result of observation by use of a scanning electron microscope, there was seen no formation of rims, and also the pit diameter was found to be 3.0±0.4 μm, uniform in size, and conformable in shape.

EXAMPLE 5

Twenty (20) parts by weight of Acid Black 77 (trade name: Dialeather Black G; available from Mitsubishi Chemical Industries Limited) was dissolved in 100 parts by weight of pure water, and the resulting solution was applied on a transparent polyvinyl chloride sheet of 1.0 mm thick by coating with use of a bar coater to provide a light-absorptive layer having a dried film thickness of 0.8 μm.

Subsequently, a polyvinyl alcohol/acrylonitrile graft polymerized film was dipped in an acetone solution to make a porous film, and, thereafter, this porous film was dipped in an aqueous solution obtained by dispersing 35 parts by weight of silver particles (particle diameter: 200 to 400 Å) in 50 parts by weight of acetone, to obtain a reflective porous film having a dried film thickness of 2.0 μm.

By having interposed a transparent adhesive layer on the above light-absorptive layer, this reflective layer was laminated on the aforesaid light-absorptive layer, and they were bonded with use of a roller to obtain an optical recording layer of 10.0 μm thick.

On the resulting optical recording layer, writing and reading were carried out under the same conditions as in Example 3. As a result, there was obtained 0.56 or more of contrast, and, as a result of observation by use of a scanning electron microscope, there was seen no formation of rims, and also the pit diameter was found to be 3.0±0.3 μm, uniform in size, and conformable in shape.

COMPARATIVE EXAMPLE 2

A recording layer was produced in all the same procedures and conditions as in Example 3 except that the blowing agent, azodicarbonamide, was not added, and writing and reading were carried out under the same conditions. As a result, there was obtained the contrast of 0.38 in the reading, and also the pit size was found not uniform to be 3.0±1.5 μm, with formation of rims.

EXAMPLE 8

In 50 parts by weight of an ethanol solution containing 20% by weight of polyvinyl butyral, 30 parts by weight of a cyanine type dye, NK 1414 (available from Nikko Kanko Shikiso K.K.), and 15 parts by weight of dinitropentamethylenetetramine as a blowing agent were compounded to effect homogeneous mixing, and the mixture was applied on a polycarbonate substrate of 1.0 mm thick by means of a bar coater to carry out film formation, thereby providing a porous light-absorptive layer having a film thickness of 5 μm and voids of 65%.

Subsequently, gold was vacuum-deposited on the light-absorptive layer to provide a light-reflective layer having a film thickness of 50 Å to obtain an optical recording medium having a porous optical recording layer.

On the resulting optical recording layer, writing was performed using a semiconductor laser of 830 nm with beam diameter of 3 μm and with a power of 3 mW on the recording face. As a result, there was obtained 0.80 or more of contrast in the reading signal at the reading power of 0.1 mW.

The recording pits formed here were observed with use of a scanning electron microscope to reveal that no rim was formed and there were obtained recording pits having a pit diameter of 3.0±0.1 μm and being very uniform in their size.

EXAMPLE 7

Carbon black (available from Columbia Carbon Co.) was mixed into a methylene chloride solution containing 15% by weight of cellulose triacetate (available from Kodak Co.) so as to be in amount of ½ in weight ratio to the cellulose triacetate, and the mixture, after stirring for about 2 hours, was applied on a transparent polymethyl methacrylate substrate of 1.0 mm thick by bar coating, which was then dipped in an ethanol solution, followed by drying to obtain a porous film having a film thickness of 5 μm.

Subsequently, an aluminum-deposited film was provided on the above light-absorptive layer to have a thickness of 200 Å, thereby obtaining an optical recording medium having a porous optical recording layer.

On the resulting optical recording layer, writing and reading were performed under the same conditions as in Example 6. As a result, there was obtained 0.60 or more of contrast in the reading signal.

The recording pits formed were observed with use of a scanning electron microscope to reveal that no rim was formed and there were obtained recording pits having pit diameter of 3.0±0.2 μm and being very uniform in their size.

EXAMPLE 8

To an ethylene dichloride solution containing 10% by weight of polyvinyl acetate (molecular weight: 1,400 to 1,600; available from Wako Pure Chemical Industries, Ltd.), 20 parts by weight each of azodicarbonamide and Mordant Black 86 (trade name: Mitsui Chrome Black ME; available from Mitsui Toatsu Chemicals, Inc.) were added, and the mixture, after thorough stirring, was applied on a transparent polyethylene terephthalate substrate of 0.18 mm thick by bar coating to obtain a porous light-absorptive layer having a dried film thickness of 6.5 μm and voids of 85%.

Subsequently, a copper coating of 90 Å thick was applied on the above light-absorptive layer by chemical plating to provide a light-reflective layer, thereby obtaining an optical recording medium having a porous optical recording layer.

On the resulting optical recording layer, writing and reading were carried out under the same conditions as in Example 6. As a result, there was obtained 0.5 or more of contrast.

Also, as a result of observation by use of a scanning electron microscope, there was seen no formation of rims, and also the pit diameter was found to be 3.0±0.3 μm, steady in size, and uniform in shape.

COMPARATIVE EXAMPLE 3

Using all the same procedures and conditions as in Example 6 except that no dinitropentamethylenetetramine was used, obtained was an optical recording medium comprising an optical recording layer having a film thickness of 4.5 μm.

On the resulting optical recording layer, writing was performed under the same conditions as in Example 6, and, as a result, there was obtained 0.40 or more of contrast. However, rims of about 0.1 to 0.5 μm wide were seen on the peripheries of pits, and also the pits were found to have nonuniform size and shape.

EXAMPLE 9

In 50 parts by weight of an ethanol solution containing 20% by weight of polyvinyl butyral, 30 parts by weight of Sunchromine Black PEL (available from Sumitomo Chemical Co., Ltd.) were compounded to effect homogeneous mixing, and the mixture was applied on a transparent polyethylene substrate of 0.3 mm thick by means of a bar coater to carry out film formation, thereby providing a light-absorptive layer having a film thickness of 3.5 μm.

Subsequently, 20 parts by weight of polyvinyl butyral and 20 parts by weight of azodicarbonamide as a blowing agent were dispersed in a cyclohexane solution to effect homogeneous mixing, and the mixture was applied on the above light-absorptive layer by means of a bar coater to carry out film formation, thereby providing a porous recording auxiliary layer having a film thickness of 2 μm and voids of 70%.

Aluminum was further vapor-deposited on the above recording auxiliary layer to provide a light-reflective layer having a film thickness of 130 Å, thereby obtaining an optical recording medium having a porous optical recording layer.

On the resulting optical recording layer, writing was performed using a semiconductor laser of 830 nm with beam diameter of 3 μm and with a power of 3 mW on the recording face. As a result, there was obtained 0.75 or more of contrast in the reading signal at the reading power of 0.1 mW.

The recording pits formed here were observed with use of a scanning electron microscope to reveal that no rim was formed and there were obtained recording pits having a pit diameter of 3.0±0.25 μm and being very uniform in their size.

EXAMPLE 10

On a polyvinyl chloride substrate of 1.0 mm thick, an aqueous solution containing 40% by weight of an acidic dye, Aflast Black SW (available from Orient Chemical Industries Ltd.), was applied by spinner coating to provide a light-absorptive layer having a dried film thickness of 1.5 μm.

Subsequently, to a methanol solution containing 20% by weight of polyvinyl alcohol, azodicarbonamide (available from Kishida Chemical Co., Ltd.) was added as a blowing agent so as to be in amount of ½ in weight ratio to said polyvinyl alcohol. The resulting solution was applied on the above light-absorptive layer by bar coating to laminate a porous recording auxiliary layer having a film thickness of 7 μm. Further on it, gold-deposited film was provided to have a thickness of 100 Å to obtain an optical recording medium.

On the resulting optical recording medium, writing was performed using a semiconductor laser of 830 nm with beam spot diameter of 4 μm and with a power of 6 mW on the recording face. As a result, there was obtained 0.73 or more of contrast in the reading signal under the condition of the reading power of 0.2 mW.

The recording pits formed here were observed with use of a scanning electron microscope to reveal that no rim was formed and there were obtained recording pits having a pit diameter of 4.0±0.3 μm and being very uniform in their size and shape.

COMPARATIVE EXAMPLE 4

Using all the same procedures and conditions as in Example 9 except that no blowing agent azodicarbonamide was used, to obtained was an optical recording medium comprising an optical recording layer having a film thickness of 3.3 μm.

On the resulting optical recording layer, writing was performed under the same conditions as in Example 9, and, as a result, there was obtained 0.40 or more contrast.

However, rims of about 0.1 to 0.5 μm wide occurred on the peripheries of recording pits, and also the pits was found to have non-uniform size and shape.

What is claimed is:

1. An optical recording method which comprises the step of irradiating an optical recording medium comprising a substrate and a recording layer which consists of a porous light-absorptive layer and a light-reflective layer on said porous light-absorptive layer with a beam of light to cause thermal softening and melting deformation of the porous light-absorption layer, thereby deforming said light-reflective layer corresponding to said deformation of said porous light-absorptive layer and forming a recording pit without a rim in the light-reflective layer.

2. An optical recording method according to claim 1, wherein said light-absorptive layer has voids from 10% to 90%.

3. The optical recording method according to claim 2, wherein said light-absorptive layer has voids from 20% to 80%.

4. The optical recording method according to claim 1, wherein the light-absorptive layer has a thickness of 700 angstroms to 1.8 millimeters.

5. The optical recording method according to claim 1, wherein said light-reflective layer has a thickness of 20 angstroms to 1 millimeter.

6. The optical recording method according to claim 1, wherein said light-reflective layer has a reflectance of 10% to 85%.

7. The optical recording method according to claim 1, wherein said light-reflective layer has a reflectance of 15% to 60%.

8. An optical recording method which comprises the step of irradiating an optical recording medium comprising a substrate and a recording layer which consists of a light-absorptive layer, a porous recording auxiliary later on said light-absorptive layer, and a light-reflective layer on said porous recording auxiliary layer with a beam of light to cause thermal softening and melting deformation of the porous recording auxiliary layer, thereby deforming the light-reflective layer corresponding to said deformation of the porous recording auxiliary layer and forming a recording pit without a rim in the light-reflective layer.

9. The optical recording method according to claim 8, wherein said light-absorptive layer has voids of 10% to 90%.

10. The optical recording method according to claim 9, wherein said light-absorptive layer has voids from 20% to 80%.

11. The optical recording method according to claim 8, wherein said light-reflective layer has a thickness of 20 angstroms to 1 millimeter.

12. The optical recording method according to claim 8, wherein said light-reflective layer has a reflectance of 10% to 85%.

13. The optical recording method according to claim 8, wherein said light-reflective layer has a reflectance of 15% to 60%.

14. The optical recording method according to claim 8, wherein said light-absorptive layer has a thickness of 200 angstroms to 0.5 millimeter.

* * * * *

UNITED STATES PATENT AND TRADEMARK OFFICE
CERTIFICATE OF CORRECTION

PATENT NO. : 5,026,623

DATED : June 25, 1991

INVENTOR(S) : HIROYUKI IMATAKI, ET AL.

Page 1 of 3

It is certified that error appears in the above-identified patent and that said Letters Patent is hereby corrected as shown below:

COLUMN 5

Line 25, "ten AÅ" should read --ten Å-- and "20 AÅ" should read --20 Å--.
    Line 46, "ten AÅ" should read --ten Å-- and "700 AÅ" should read --700 Å--.

COLUMN 6

Line 8, "layer" should read --layer.--.
    Line 35, "ten AÅ" should read --ten Å-- and "20 AÅ" should read --20 Å--.

COLUMN 7

Line 13, "ten AÅ" should read --ten Å-- and "700 AÅ" should read --700 Å--.

COLUMN 8

Line 9, "ten AÅ" should read --ten Å-- and "200 AÅ" should read --200 Å--.
    Line 35, "ten AÅ" should read --ten Å-- and "700 AÅ" should read --700 Å--.

UNITED STATES PATENT AND TRADEMARK OFFICE
CERTIFICATE OF CORRECTION

PATENT NO. : 5,026,623

DATED : June 25, 1991

INVENTOR(S) : HIROYUKI IMATAKI, ET AL.

It is certified that error appears in the above-identified patent and that said Letters Patent is hereby corrected as shown below:

COLUMN 9

Line 13, "The" should read --¶ The--.
    Line 28, "occurence" should read --occurrence--.

COLUMN 10

Line 38, "500 AÅ," should read --500 Å,--.
    Line 68, "400 AÅ)" should read --400 Å)--.

COLUMN 11

Line 26, "EXAMPLE 8" should read --EXAMPLE 6--.
    Line 39, "50 AÅ" should read --50 Å--.
    Line 68, "200 AÅ," should read --200 Å,--.

COLUMN 12

Line 25, "90 AÅ" should read --90 Å--.

COLUMN 13

Line 5, "130 AÅ" should read --130 Å--.
    Line 36, "AÅ" should read --Å--.

UNITED STATES PATENT AND TRADEMARK OFFICE
CERTIFICATE OF CORRECTION

PATENT NO. : 5,026,623
DATED : June 25, 1991
INVENTOR(S) : HIROYUKI IMATAKI, ET AL.

It is certified that error appears in the above-identified patent and that said Letters Patent is hereby corrected as shown below:

COLUMN 14

Line 35, "later" should read --layer--.

Signed and Sealed this

Twenty-ninth Day of December, 1992

Attest:

DOUGLAS B. COMER

Attesting Officer     Acting Commissioner of Patents and Trademarks